(12) United States Patent
Waters

(10) Patent No.: US 9,179,730 B2
(45) Date of Patent: Nov. 10, 2015

(54) HUNTING BOOT WITH POCKET FOR SCENT WICK

(71) Applicant: Jimmy Lee Waters, Gaffney, SC (US)

(72) Inventor: Jimmy Lee Waters, Gaffney, SC (US)

( * ) Notice: Subject to any disclaimer, the term of this patent is extended or adjusted under 35 U.S.C. 154(b) by 136 days.

(21) Appl. No.: 13/868,356

(22) Filed: Apr. 23, 2013

(65) Prior Publication Data

US 2014/0310996 A1   Oct. 23, 2014

(51) Int. Cl.
*A43B 3/00* (2006.01)
*A43C 19/00* (2006.01)
*A01M 31/00* (2006.01)

(52) U.S. Cl.
CPC ............ *A43B 3/0031* (2013.01); *A01M 31/008* (2013.01); *A43C 19/00* (2013.01)

(58) Field of Classification Search
CPC ........... A43B 3/00; A43B 3/0031; A43B 5/00
USPC ............................................. 36/113, 132, 136
See application file for complete search history.

(56) References Cited

U.S. PATENT DOCUMENTS

| | | | |
|---|---|---|---|
| 4,186,502 A | 2/1980 | Foster | |
| 4,302,899 A * | 12/1981 | DeHart | 43/1 |
| D277,616 S | 2/1985 | Gamm | |
| 4,722,477 A | 2/1988 | Floyd | |
| 5,024,008 A * | 6/1991 | Maples | 36/136 |
| 5,074,439 A | 12/1991 | Wilcox | |
| 5,148,949 A * | 9/1992 | Luca | 222/175 |
| 5,327,667 A | 7/1994 | Fore | |
| D386,256 S | 11/1997 | Turpin | |
| D401,394 S | 11/1998 | Herndon | |
| 6,038,804 A | 3/2000 | Cuerrier | |
| 6,202,324 B1 * | 3/2001 | Whitlock | 36/7.1 R |
| 7,533,832 B2 | 5/2009 | Price et al. | |
| 8,151,492 B2 * | 4/2012 | Rackiewicz et al. | 36/136 |
| 2005/0183293 A1 * | 8/2005 | Mick | 36/136 |
| 2006/0102737 A1 * | 5/2006 | Harmon et al. | 239/6 |
| 2008/0163515 A1 | 7/2008 | Rackiewicz et al. | |

* cited by examiner

*Primary Examiner* — Khoa Huynh
*Assistant Examiner* — Sharon M Prange

(57) ABSTRACT

A scent dispersing boot is provided having a vertically aligned pocket attached to the upper, wherein the pocket is biased in an open position and apertured to allow air to circulate. A wick is impregnated with a game-attracting scent and inserted in the pocket. The pocket is particularly suited for use with spike wicks, having a head and a leg, wherein the leg is dipped in a liquid, game-attracting scent and inserted in the pocket with the leg of the wick extending from the bottom of the pocket.

12 Claims, 7 Drawing Sheets

FIG. -1-

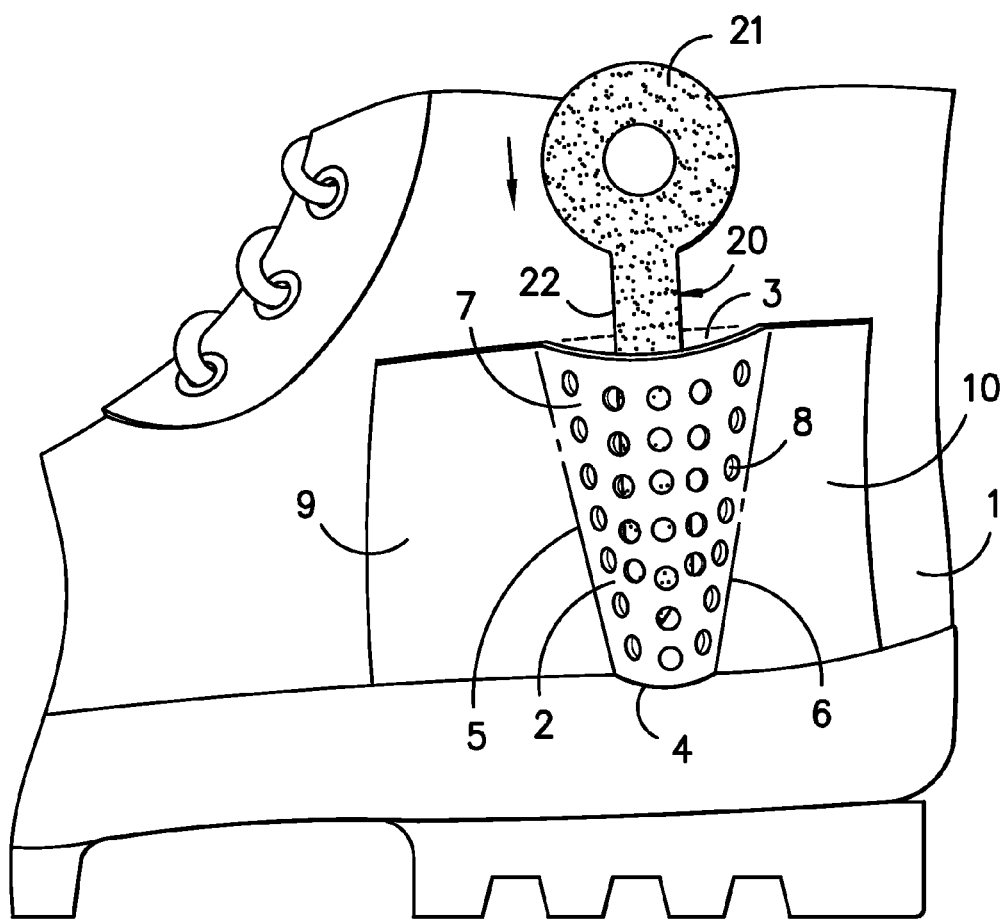
FIG. -2-

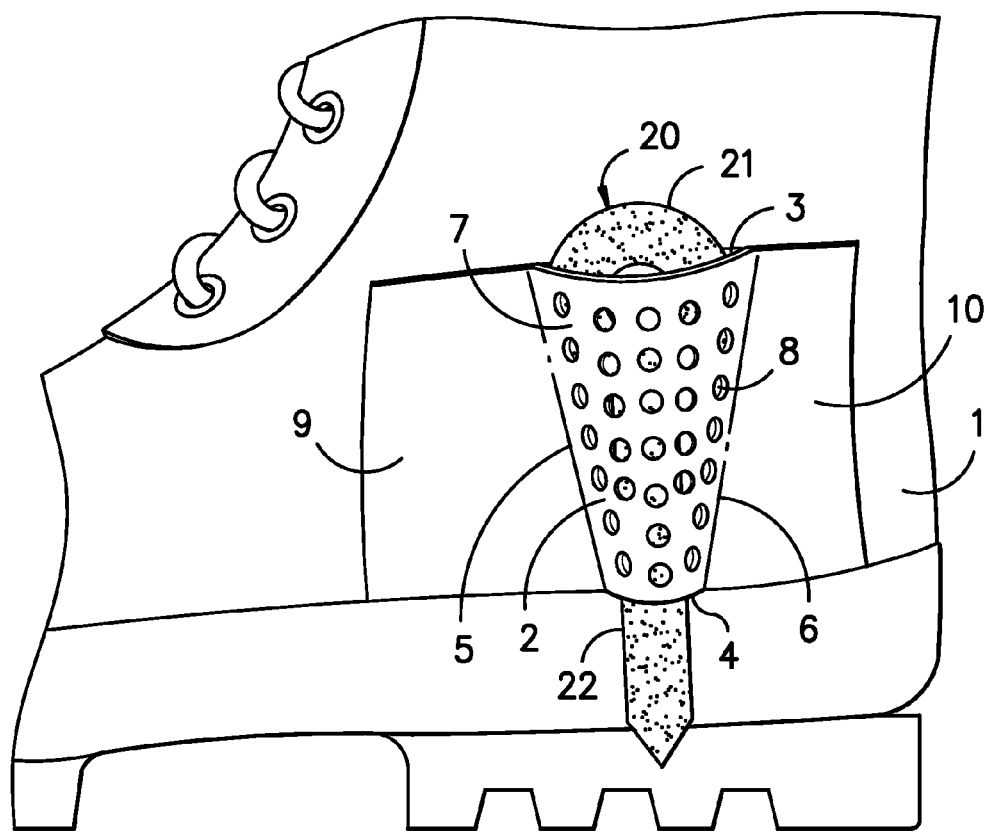
FIG. -3-

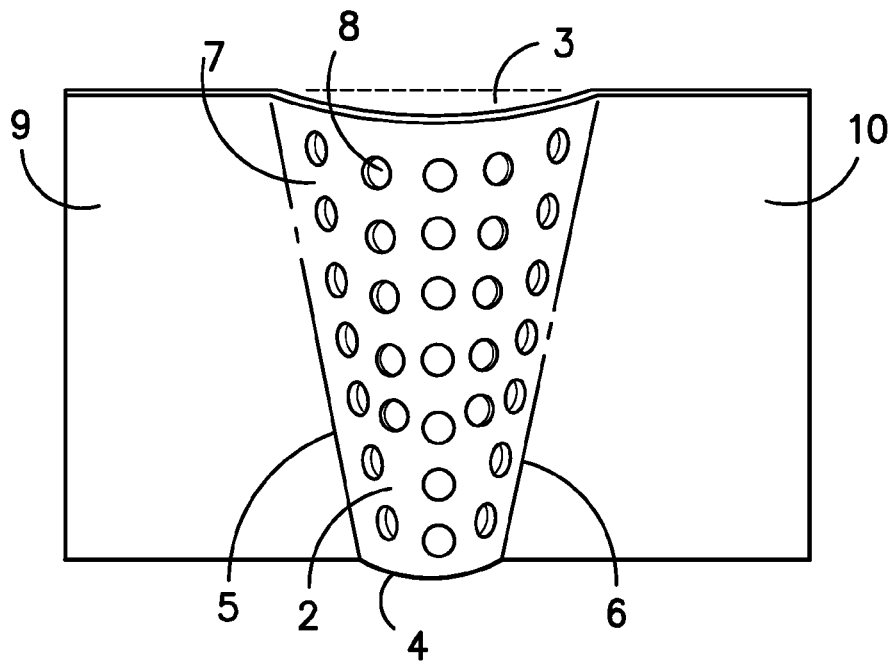
FIG. -4-
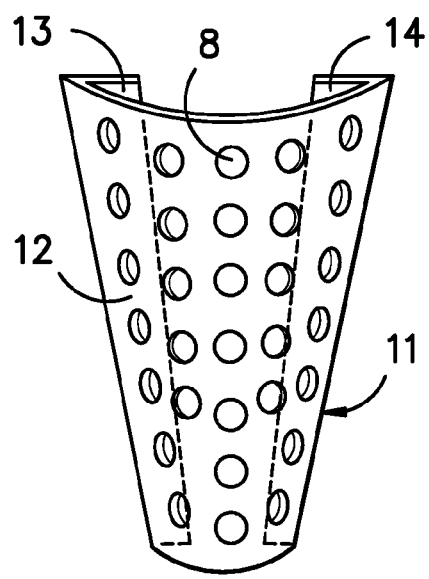
FIG. -5-

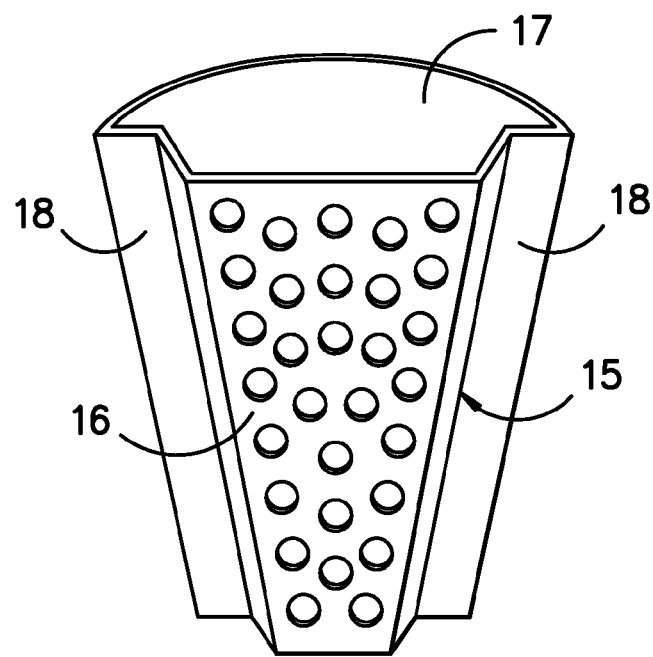
FIG. -6-
FIG. -7-

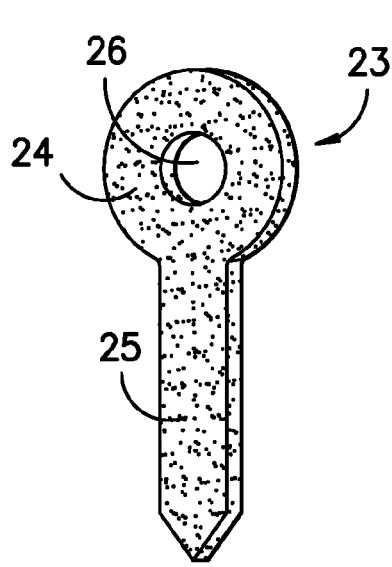
FIG. -8-
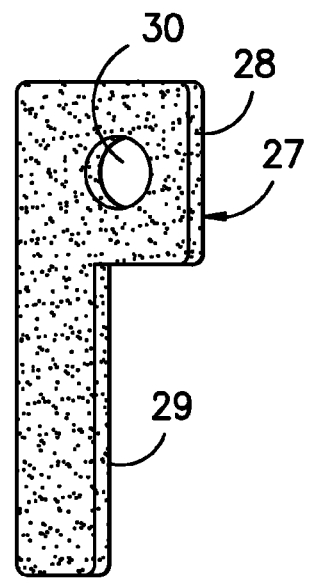
FIG. -9-
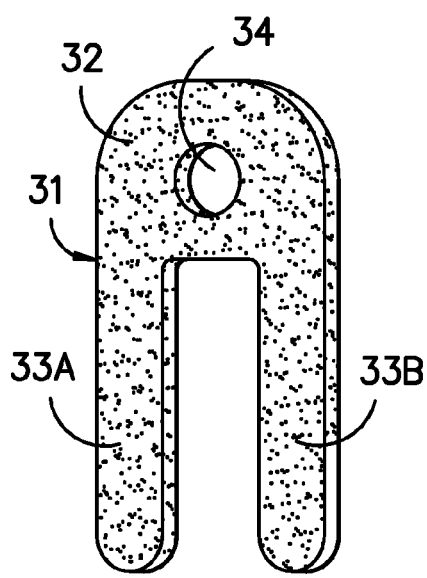
FIG. -10-
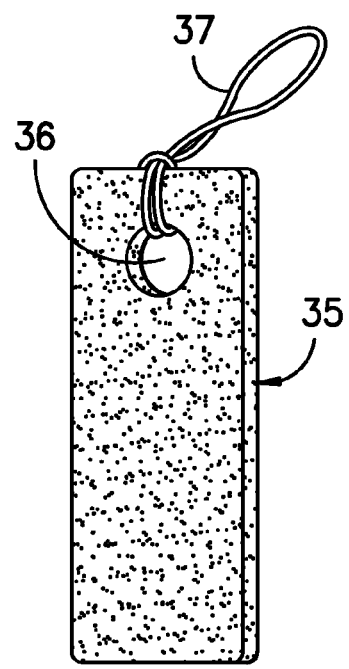
FIG. -11-

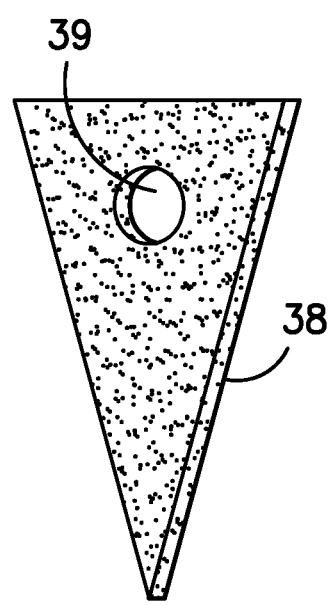
FIG. -12-

HUNTING BOOT WITH POCKET FOR SCENT WICK

This invention is directed to a boot worn by hunters, which is modified to provide a pocket for holding a wick impregnated with a liquid game-attracting scent. The pocket may be located on the side of the boot, adjacent the ankle, and is biased in an open position, to generate air flow and allow for convenient insertion and removal of the wick.

BACKGROUND OF THE INVENTION

Various devices have been disclosed for use by hunters to disperse a scent into the environment, for attracting wild game. Generally, the devices may form an integral part of a boot, be attachable to a boot or the hunter's leg, or be dragged behind a hunter while walking.

Foster—U.S. Pat. No. 4,186,502 discloses a hunting boot with a pocket located above the heel, for holding a pad impregnated with a scent. The pocket is ventilated and flexes while the hunter walks, thereby communicating the scent to the air. Rackiewicz et al.—U.S. Pat. No. 8,151,492 disclose a hunting boot having an integrated scent-carrying vented compartment. The compartment includes a mesh flap that folds down to insert a scented material.

A scented material may be temporarily affixed to a hunter's boot by various means. Fore—U.S. Pat. No. 5,327,667 discloses an absorbent portion sandwiched between first and second flexible strips. The composite contains a liquid scent in a sealed, brittle container. The brittle container is crushed to release the liquid, and an adhesive on the strip attaches the device to a hunter's footwear. Cuerrier—U.S. Pat. No. 6,038,804 discloses a scent dispenser that fits under the sole of a hunter's boot and is held in place by a strap. Floyd—U.S. Pat. No. 4,722,477 discloses a strap having an absorbent portion for absorbing a liquid game scent. The strap may be attached to a hunter's foot and held in place, for example, by Velcro.

Price et al.—U.S. Pat. No. 7,533,832 disclose a leg mounted scent dispenser. The dispenser may be a canister with a drip valve or pump that discharges a small amount of liquid each time the boot lands. Another scent dispenser attachable to a hunter's boot is shown in Turpin—Des. 386,256.

An example of a scent dispersing device that is intended to be dragged behind by a hunter while walking is disclosed in Wilcox—U.S. Pat. No. 5,074,439.

Despite the myriad devices disclosed for use by hunters to disperse a game-attracting scent, shortcomings remain. The built-in pockets for boots that are intended to hold a scent impregnated absorbent material are typically complex in design and represent increased manufacturing cost. The built-in pockets tend to have a relatively small capacity for the absorbent material, and the absorbent material is pressed tightly against the boot, which limits air circulation. The devices are not able to accommodate commonly used absorbent material for game scents, such as spike wicks.

Devices that incorporate a built-in or pre-manufactured absorbent material are limited in that they do not accommodate a variety of wicks and/or scents. If the used absorbent material cannot be exchanged with fresh material, the device has a limited life and must be replaced regularly.

On the other hand, devices that attach to the sole of the hunter's boot or are dragged behind the hunter can easily become waterlogged, coated with mud, tangled with underbrush or otherwise rendered ineffective. Devices that incorporate a vessel filled with a liquid scent are bulky and heavy, and can interfere with a hunter's stride.

SUMMARY OF THE INVENTION

The present invention overcomes many, if not all, of the foregoing shortcomings in the prior art. Virtually any style of hunting boot can be provided with the pocket for accommodating a wick impregnated with a game-attracting scent, as disclosed and claimed herein, as original equipment. Alternatively, existing hunting boots can be modified to provide a pocket according to the present invention, and the invention is adapted to be provided as a kit, for use as an after-market conversion.

Accordingly, a scent dispersing boot is provided wherein a boot is modified by providing a strip of material attached to the side, to form a pocket for a wick. The pocket is characterized by a top, a bottom, and first and second side edges. The strip of material is apertured and biased in an open position, to allow air to freely circulate through the pocket and to allow easy insertion and removal of a wick. The top of the pocket is open.

A wick, impregnated with a game-attracting scent, is inserted in the pocket. The present invention may be used in combination with relatively high-capacity absorbent materials, such as spike wicks, which can be easily impregnated by dipping the leg of the wick in a jar of liquid containing a game-attracting scent and inserted in the pocket. The wick may be provided with a hanger, such as a hole in the wick or a loop of string, so that the wick may be removed from the boot pocket and hung on the branch of a bush or tree, near the hunter's blind.

In one embodiment of the invention, the bottom of the pocket is open, as well as the top of the pocket. Several advantages are realized from such a configuration. First, the liquid game-attracting scent may drip from the wick to the ground, from the bottom opening, as a hunter is walking. Second, an absorbent material packed in the pocket can be easily removed with a rod. Third, the pocket may easily be washed out after use. Additionally, an elongated wick may even be allowed to protrude from the bottom of the pocket, so that the wick may come in contact with the ground as the hunter is walking, without being crushed by the weight of the hunter.

The weight added to a boot when it is modified by providing the pocket and scent impregnated wick of the present invention is negligible, and the pocket does not interfere with a hunter's stride.

BRIEF DESCRIPTION OF THE DRAWINGS

FIG. 1 is a side perspective view of the scent dispensing boot.

FIG. 2 is an enlarged side view of the pocket formed from a strip of material, with a felt wick being inserted therein.

FIG. 3 is an enlarged side view of the pocket formed from a strip of material, with a felt wick inserted therein.

FIGS. 4-6 depict various pocket designs.

FIG. 7 depicts a form that may be used to create a pocket suitable for use in the present invention, for example, with an after-market adapter kit.

FIGS. 8-12 depict various elongated wicks, with hangers, that may be used in the present invention.

DETAILED DESCRIPTION OF THE INVENTION

Without intending to limit the scope of the invention, the preferred embodiments and features are hereinafter set forth. All United States patents cited in the specification are incorporated herein by reference.

The present invention is adapted for use with virtually any type of boot worn by hunters. By way of example, the uppers (portion of the boot above the sole) may be leather, rubber, textile fabric, thermoplastic or thermosetting polymer, and combinations thereof. The upper material may incorporate a liquid water impermeable/water vapor permeable sheet, such as Goretex®. Of particular utility are waterproof boots made of a textile fabric/rubber laminate. The term "boot" is intended to include shoes and other footwear wherein the portion of the upper adjacent a wearer's ankle is 2" high or more. The upper of a boot may be divided between the vamp, i.e. the front part of the boot that covers the phalanges and metatarsals of a wearer's foot, and the quarter, i.e. the sides and back of the boot, extending back from the vamp. The boot may have a camouflage design on the outside, or it may be a solid color.

FIG. 1 depicts the scent dispersing boot of the present invention. Boot 1 has pocket 2 attached to the outside of the quarter section of the boot. Pocket 2 has top 3, bottom 4 and side edges 5 and 6. The outside sheet 7 of pocket 2 is apertured and biased open, that is, bowed outward away from boot 1, creating an opening at top 3. In one embodiment of the invention, bottom 4 of pocket 2 is also open, as shown in FIGS. 1-6.

The apertures 8 in pocket 2 are shown as perforations punched through sheet 7. It can be understood that the apertures in sheet 7 may be satisfied by providing an open construction, such as a mesh or grill, rather than perforations made in a continuous sheet of material. Nevertheless, it is believed that a solid sheet that is perforated to provide a plurality of the small holes is advantageous to minimize sticks and thorns from becoming entangled with, poking into or tearing sheet 7.

Pocket 2 can be made of virtually any sheet-like material. By way of example, the strip can be made of leather, natural or synthetic elastomer, or thermoplastic or thermoset polymers. Strip 2 may also be a composite material, such as an elastomer coated scrim or textile fabric. By way of example, the sheet-like material may be a rubber coated fabric, such as is used to manufacture waterproof boots. Pocket 2 may have an outside surface that matches the color and texture of the boot, whether camouflage or a solid color. The sheet-like material is preferably both flexible and resilient, to withstand the rigors of trekking through the woods.

The pocket may be located on the "upper" portion of the boot, preferably along the quarter portion of the upper. In one embodiment of the invention, the pocket is position on the upper adjacent a wearer's ankle, extending upward from the sole of the boot. The pocket may be positioned on the inwardly facing or outwardly facing sides of the boot. A pocket and scent impregnated wick may be provided on one or both boots, and one boot may have a plurality of pockets attached thereto.

The dimensions of the pocket are selected to accommodate a wide variety and shapes of wicks. For example, pocket 2 may be tapered from top 3 to bottom 4, which creates a holster for an elongated wick. By way of example, pocket 2 may have a top opening that is 1" or greater across, a bottom opening that is ¾" inch or less across, and a distance between the top 3 to bottom 4 of the pocket is 2" or greater. The dimensions of pocket 2 may range as follows: an opening across top 3 of from 1 to 2.5 inches; an opening across bottom 4 of from 0.125 to 0.75 inches; and a height from top to bottom of from 2 to 4.5 inches. Top 3 of pocket 2 may be biased open ¼" or greater, or even ½" or greater, as measured at the greatest distance perpendicular to the surface of boot 1.

In the embodiment shown in FIGS. 1, 2 and 3, pocket 2 is attached to boot 1 at ends 9 and 10 of sheet 7, at either side of pocket 2. Sheet 7 may be attached by any of a variety of techniques known to those skilled in the art, including by stitching, adhesives, for example, reactive, non-reactive and hot melt adhesives, chemical bonding, and lamination with heat and/or pressure. By way of example, sheet 7 may be attached with a solvent-containing elastomeric gel, such as Shoe Goo®, or a heat-curing, solventless elastomer. Sheet 7 may be a continuous material, or it may be constructed of dissimilar materials connected together.

Referring to FIGS. 4-6, various embodiments of the pocket of the present invention are disclosed. FIG. 4 corresponds to the design depicted in FIGS. 1-3. FIG. 5 depicts a design for pocket 11 made from sheet 12, having ends 13 and 14, which are folded inward behind pocket 11, before being attached to boot 1. FIG. 6 depicts a design for pocket 15 formed by joining together outer sheet 16 and inner sheet 17, along side edges 18. Outer sheet 16 may be preformed, so that it is biased open, and pocket 15 can be easily assembled. Sheets 16 and 17 may be attached by any of a variety of methods, including by adhesive, heat sealing or sewing, or sheets 16 and 17 may be a unitary construction, for example, a single, injected molded piece. The design in FIG. 6 is particularly useful if the boots being used are not waterproof or have an outside layer that can absorb a liquid. Inner sheet 17 prevents the liquid containing the game-attracting scent from permeating the boot upper.

All of the designs depicted in FIGS. 4-6 can be used as part of an after-market kit for converting a boot. The pockets may be provided in a biased-open configuration, for example by heat setting or cross-linking the sheet prior to use. Alternatively, the kit may include form 19, for example, as shown in FIG. 7, and the sheet may be configured around the form to create the desired shape of the pocket, before being attached. In each of the examples, the kit may include a suitable adhesive, or the portion of the sheet that is attached to the boot may be coated with an adhesive protected with a removable, non-stick cover.

The wick is an absorbent material, which can be impregnated with a liquid containing a game-attracting scent. By way of example, the game-attracting scent may be dispersed in an aqueous liquid and/or alcohol, and the wick is capable of absorbing the liquid. Preferably, the wick is capable of absorbing its weight in liquid. The present invention is capable of accommodating a wide variety and shape of wicks. For example, the wick may be one or more cotton balls or a section of textile fabric inserted into the pocket. Of particular utility for wicks are felts, which may be sheets of nonwoven or woven fibers, and the fibers may be natural or synthetic or combinations thereof.

The pocket may be aligned vertically, that is, with the top 3 higher than the bottom 4, and generally perpendicular to the sole of the boot. An advantage of the present invention is that the wick need not be adhered to the pocket. Accordingly, even if a wick can be freely slid in and out of the pocket, so long as the wick is wider than the bottom opening of the pocket, the wick will be held in place by gravity. For example, in one embodiment of the invention the wick is an elongated felt strip, which can be dipped into a liquid containing a game-attracting scent and then freely slid into and out of the pocket.

Another advantage of the invention is that it is compatible with spike wicks, which are commonly used by hunters for dispersing a game-attracting scent by dipping the wick into a liquid containing the scent and hanging the wick from the branch of a tree or shrub. The spike wicks have an elongated shape, and may be made from a felt sheet having a thickness of from ⅛" to ½". In one embodiment of the invention, the spike wick is characterized by a head and a leg attached to the head. The head may be from 1" to 2" across, and the leg may be from ¼" to ¾" across. The wick may be from 2½" to 4" long. The wick may be held by the head, and the leg of the wick is dipped into the liquid containing the game-attracting scent, then the wick is slid into the pocket.

Referring to FIGS. 2 and 3, wick 20, having head 21 and leg 22 is inserted into pocket 2. The leg 22 of wick 20 protrudes from the bottom opening 4 of pocket 2, when the wick is fully inserted. The head 21 of wick 20 is wider than the bottom opening 4 of pocket 5, and wick 20 is held in place when it becomes wedged against sides 5 and 6 of pocket 2, formed as pocket 2 tapers from top opening 3 to bottom opening 4. The scent may be spread by (i) air circulating through the pocket, (ii) liquid dripping through the opening in the bottom of the pocket, and (iii) the portion of the wick extending from the bottom of the pocket directly contacting the ground and vegetation while the hunter is walking.

Examples of elongated wicks suitable for use in the present invention are depicted in FIGS. 8-12. FIG. 8 depicts spike wick 23 having head 24, leg 25 and hole 26, for hanging the wick from a branch. FIG. 9 depicts wick 27 having head 28, leg 29 and hole 30. FIG. 10 depicts wick 31 having head 32, legs 33*a* and 33*b*, and hole 34. It can be understood that legs 33*a* and 33*b* will be compressed together when wick 31 is inserted in the pocket of the present invention. FIG. 11 depicts wick 37 having hole 36 and loop of string 37. The elongated wick 37 may be inserted into the pocket of the present invention, until it becomes wedged against the sides of the pocket, and need not protrude from the bottom of the pocket. FIG. 12 discloses wick 38 having a triangular or wedge shape, and having hole 39. Wick 38 may be tapered to conform to the taper of the pocket into which it will be inserted, thereby maximizing the volume of material capable of absorbing the liquid containing a game-attracting scent.

The wick may be hung from a branch by string or by inserting a branch into a hole in the wick. The wick may be provided with other means to hang the wick from a branch, such as a wire hook or clip. Accordingly, a hunter may remove the wick from the pocket of the boot, and hang the wick from a branch of a tree or shrub, when the hunter has arrived at his blind.

The invention is not limited to use with a particular game-attracting scent or form of the scent. For example, the game-attracting scent may be selected to attract deer, elk, moose, bears, hogs, predators, varmints, etc. The scent may mimic the odor of females in heat, rival animals, prey or edible vegetation, or the game-attracting scent may mask the hunter's own scent. The game-attracting scent used to impregnate the wick may be dispersed in a liquid or gel, or the scent may be in solid form, with the wick serving as a support. Examples of various game-attracting scents are available from Tinks® located in Texas, USA.

There are, of course, many alternative embodiments and modifications, which are intended to be included within the following claims.

What I claim is:

1. A scent dispersing boot, comprising:
   (a) a boot having a sole and an upper, wherein the upper comprises a quarter section extending upward from the sole;
   (b) a pocket formed from a strip of material positioned on the quarter section of the upper, wherein the pocket is defined by a first side edge attached to the upper, a second side edge attached to the upper opposite the first side edge, a top and a bottom, wherein the pocket is aligned vertically and extends upward from a sole of the boot, and the top of the pocket is wider across than the bottom of the pocket, and whereby the top of the pocket is in a biased-open position, wherein the strip of material between the first and second side edges of the pocket is aperture, and wherein the bottom of the pocket is open;
   (c) a wick inserted in the pocket, wherein the wick is a felt sheet and the wick is wider than the bottom of the pocket, such that the wick is wedged against the first side edge and second side edge of the pocket, and wherein the wick comprises a head and a leg, wherein the head of the wick is wider than the bottom of the pocket and the leg of the wick protrudes from the bottom of the pocket; and
   (d) a game-attracting scent impregnating the wick.

2. The scent dispensing boot of claim 1, wherein top of the pocket is 1" or greater across and the bottom of the pocket is ¾" inch or less across, the distance between the top of the pocket and the bottom of the pocket is 2" or greater, and the top of the pocket is biased open IA" or greater.

3. The scent dispensing boot of claim 1, wherein the wick comprises a hanger for hanging the wick from a tree or shrub branch when the wick is removed from the pocket, and the hanger comprises a hole in the wick.

4. The scent dispensing boot of claim 1, wherein the upper of the boot forms an inside of the pocket.

5. The boot of claim 1, wherein the head of the wick has a hole therein for hanging the wick from a tree or shrub branch when the wick is removed from the pocket.

6. A scent dispensing boot, comprising:
   (a) a boot having an upper;
   (b) a strip of resilient material, the strip having a first side edge attached to the upper of the boot, a second side edge attached to upper of the boot, and a middle section between the first and second edges, wherein the middle section is apertured and bowed away from the boot to form a biased-open pocket, wherein the pocket has a top and a bottom, and the top of the pocket is wider across than the bottom of the pocket, and wherein the bottom of the pocket is open;
   (c) a wick inserted in the pocket, wherein the wick is not adhered to the pocket and is removable by sliding the wick relative to the pocket, wherein the wick is a sheet and the wick is wider than the bottom of the pocket, such that the wick is wedged against the first side edge and second side edge of the pocket, and wherein the wick is a felt sheet having a thickness of from ⅛" to ½", and wherein the wick comprises a head and a leg, wherein the head of the wick is wider than the bottom of the pocket and the leg of the wick protrudes from the bottom of the pocket; and
   (d) a game-attracting scent impregnating the wick.

7. The scent dispensing boot of claim 6, wherein the pocket is aligned vertically and extends upward from a sole of the boot.

8. The scent dispensing boot of claim 7, wherein top of the pocket is 1" or greater across and the bottom of the pocket is ¾" inch or less across, the distance between the top of the pocket and the bottom of the pocket is 2" or greater, and the top of the pocket is biased open ¼" or greater.

9. The boot of claim 6, wherein the wick comprises a hanger for hanging the wick from a tree or shrub branch when the wick is removed from the pocket, and the hanger comprises a hole in the wick.

10. A scent dispensing boot, comprising:
    (a) a boot having a sole and an upper, wherein the upper comprises a quarter section extending upward from the sole;
    (b) a pocket attached to the quarter section of the upper and extending vertically upward, wherein the pocket has an outside formed of an apertured, resilient strip of material, a top, a bottom and first and second sides, wherein the pocket is biased in an open position at the top, and the first and second sides of the pocket taper inward from the top to the bottom of the pocket, and wherein the bottom of the pocket is open;

(c) a removable, elongated wick inserted in the pocket, wherein the wick is wider than the bottom of the pocket, such that the wick is wedged against the first side and second side of the pocket, and wherein the wick comprises a head and a leg, wherein the head of the wick is wider than the bottom of the pocket and the leg of the wick protrudes from the bottom of the pocket; and (d) a game-attracting scent impregnating the wick.

11. The boot of claim 10, wherein the wick comprises a hanger for hanging the wick from a tree or shrub branch when the wick is removed from the pocket.

12. The boot of claim 10, wherein the side of the boot forms an inside of the pocket.

\* \* \* \* \*